US011210584B2

(12) United States Patent
Brand et al.

(10) Patent No.: US 11,210,584 B2
(45) Date of Patent: Dec. 28, 2021

(54) MEMORY EFFICIENT CONVOLUTION OPERATIONS IN DEEP LEARNING NEURAL NETWORKS

(71) Applicant: International Business Machines Corporation, Armonk, NY (US)

(72) Inventors: Daniel Brand, Millwood, NY (US); Minsik Cho, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 778 days.

(21) Appl. No.: 15/420,127

(22) Filed: Jan. 31, 2017

(65) Prior Publication Data

US 2018/0218260 A1    Aug. 2, 2018

(51) Int. Cl.
*G06N 3/08* (2006.01)
*G06N 3/04* (2006.01)
*G06F 17/15* (2006.01)

(52) U.S. Cl.
CPC .............. *G06N 3/08* (2013.01); *G06F 17/15* (2013.01); *G06N 3/0454* (2013.01)

(58) Field of Classification Search
CPC ......... G06N 3/08; G06N 3/0454; G06N 3/084
See application file for complete search history.

(56) References Cited

U.S. PATENT DOCUMENTS

| 5,241,372 A * | 8/1993 | Ohba ................... H04N 5/2628 348/578 |
| 9,424,470 B1 * | 8/2016 | Hinterstoisser ........ B25J 9/0093 |
| 2010/0034469 A1 * | 2/2010 | Thorpe ................. G06F 16/583 382/218 |
| 2012/0113133 A1 * | 5/2012 | Shpigelblat ............. G06F 17/16 345/619 |
| 2016/0239706 A1 * | 8/2016 | Dijkman ............ G06K 9/00503 |

OTHER PUBLICATIONS

Weisstein, Eric W. "Linear Algebra." From MathWorld—A Wolfram Web Resource. http://mathworld.wolfram.com/LinearAlgebra.html (Year: 2016).*
Chetlur et al., "cuDNN: Eficient Primitives for Deep Learning" (2014) (Year: 2014).*

(Continued)

*Primary Examiner* — Kakali Chaki
*Assistant Examiner* — Kevin L. Smith
(74) *Attorney, Agent, or Firm* — Garg Law Firm, PLLC; Rakesh Garg; Kurt Goudy (57) ABSTRACT

Input image data having a plurality of pixel values represented in a two-dimensional matrix form of columns and rows is received. The input image data is transformed into a plurality of input rows. The pixel values in each input row correspond to the pixel values in a predetermined subset of the columns of the input image data and all of the rows of each column of the subset of columns. A plurality of subsets of pixel values in the plurality of input rows is determined. The number of pixel values in each row of a subset of pixel values equal in number to a number of filter values in a filter. Each input row of each subset of pixel values is convolved with the filter values of the filter to determine a corresponding output value and stored in a memory.

17 Claims, 6 Drawing Sheets

(56) References Cited

OTHER PUBLICATIONS

Cho et al., "MEC: Memory-efficient Convolution for Deep Neural Network," PMLR 70 (2017) (Year: 2017).*
Ren et al.; On Vectorization of Deep Convolutional Neural Networks for Vision Tasks, Lenovo Research & Technology, Deep learning, 2015.
Ye et al; LightNet: A Versatile, Standalone Matlab-based Environment for Deep Learning, MM '16 Oct. 15-19, 2016, Amsterdam, Netherlands.
Shwartz; Advanced Practical Machine Learning, Deep learning and Convolutional Neural Nets, cseMoodle, 2014.

* cited by examiner

MEMORY EFFICIENT CONVOLUTION OPERATIONS IN DEEP LEARNING NEURAL NETWORKS

TECHNICAL FIELD

The present invention relates generally to a method, system, and computer program product for memory efficient convolution. More particularly, the present invention relates to a method, system, and computer program product for memory efficient convolution operations in a deep learning neural network.

BACKGROUND

An Artificial Neural Network (ANN)—also referred to simply as a neural network—is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex but on much smaller scales. A large ANN might have hundreds or thousands of processor units, whereas a mammalian brain has billions of neurons with a corresponding increase in magnitude of their overall interaction and emergent behavior. A feedforward neural network is an artificial neural network where connections between the units do not form a cycle.

In machine learning, a convolutional neural network (CNN) is a type of feed-forward artificial neural network in which the connectivity pattern between its nodes (neurons) is inspired by the organization of the animal visual cortex, whose individual neurons are arranged to respond to overlapping regions tiling a visual field. Convolutional networks mimic biological processes and are configured as variations of multilayer perceptrons designed to use minimal amounts of preprocessing while processing data, such as digital images.

Convolutional neural networks (CNN) are networks with overlapping "reception fields" performing convolution tasks. A CNN is particularly efficient in recognizing image features, such as by differentiating pixels or pixel regions in a digital image from other pixels or pixel regions in the digital image. Generally, a CNN is designed to recognize images or parts of an image, such as detecting the edges of an object recognized on the image. Computer vision is a field of endeavor where CNNs are commonly used.

A deep neural network (DNN) is an artificial neural network (ANN) with multiple hidden layers of units between the input and output layers. Similar to shallow ANNs, DNNs can model complex non-linear relationships. DNN architectures, e.g., for object detection and parsing, generate compositional models where the object is expressed as a layered composition of image primitives. The extra layers enable composition of features from lower layers, giving the potential of modeling complex data with fewer units than a similarly performing shallow network. DNNs are typically designed as feedforward networks.

An important mathematical operation during neural network processing is performing a convolution between matrices. However, conventional convolution operations can require significant memory usage in computer systems or devices having memory size constraints, such as cache or prefetch memory found in central processing units (CPUs)/graphics processing unit (GPUs), or in devices with limited memory, such as mobile devices or Internet-of-Things (IoT) devices.

SUMMARY

The illustrative embodiments provide a method, system, and computer program product. An embodiment of a method includes receiving input image data having a plurality of pixel values represented in a two-dimensional matrix form of columns and rows. The embodiment further includes transforming the input image data into a plurality of input rows in which the pixel values in each input row correspond to the pixel values in a predetermined subset of the columns of the input image data and all of the rows of each column of the subset of columns. The embodiment further includes storing the plurality of input rows in a memory, and determining a plurality of subsets of pixel values in the plurality of input rows. In the embodiment, the number of pixel values in each row of a subset of pixel values is equal in number to a number of filter values in a filter, wherein the filter includes a matrix size of a predetermined filter width by a predetermined filter height. The embodiment further includes convolving each input row of each subset of pixel values with the filter values of the filter to determine a corresponding output value, and storing each output value in the memory in a two-dimensional matrix form.

In another embodiment a number of columns of the predetermined subset of the columns is equal to the filter width. In one embodiment, the pixel values in the subset of columns of the input image data are arranged in a top-to-bottom and left-to-right manner.

In another embodiment, determining the plurality of subsets includes determining a first subset, and determining a second subset in which the second subset is determined by shifting within each input row by a predetermined number of pixel values.

In one embodiment, convolving each input row of each subset of pixel values with the filter values of the filter includes multiplying each pixel value of the subset of pixel values in the input row by a corresponding filter value in the filter, and summing the results of each multiplication to determine the corresponding output value. Another embodiment includes arranging the filter values of the filter in a column representation. Another embodiment includes transforming the filter values from a two-dimensional matrix representation to the column representation.

In one embodiment, the convolving is performed in a neural network.

An embodiment of a computer usable program product includes one or more computer-readable storage devices, and program instructions stored on at least one of the one or more storage devices. The stored program instructions include program instructions to receive input image data having a plurality of pixel values represented in a two-dimensional matrix form of columns and rows. In the embodiment, the stored program instructions further include program instructions to transform the input image data into a plurality of input rows. In the embodiment, the pixel values in each input row correspond to the pixel values in a predetermined subset of the columns of the input image data and all of the rows of each column of the subset of columns. In the embodiment, the stored program instructions further include program instructions to store the plurality of input rows in a memory. In the embodiment, the stored program instructions further include program instructions to determine a plurality of subsets of pixel values in the plurality of input rows. In the embodiment, the number of pixel values in each row of a subset of pixel values is equal in number to a number of filter values in a filter in which the filter comprises a matrix size of a predetermined filter width by a predetermined filter height. In the embodiment, the stored program instructions further include program instructions to convolve each input row of each subset of pixel values with the filter values of the filter to determine a corresponding output value, and program instructions to store each output value in the memory in a two-dimensional matrix form.

An embodiment of a computer system includes one or more processors, one or more computer-readable memories, and one or more computer-readable storage devices, and program instructions stored on at least one of the one or more storage devices for execution by at least one of the one or more processors via at least one of the one or more memories. In the embodiment, the stored program instructions include program instructions to receive input image data having a plurality of pixel values represented in a two-dimensional matrix form of columns and rows. In the embodiment, the stored program instructions further include program instructions to transform the input image data into a plurality of input rows. In the embodiment, the pixel values in each input row correspond to the pixel values in a predetermined subset of the columns of the input image data and all of the rows of each column of the subset of columns. In the embodiment, the stored program instructions further include program instructions to store the plurality of input rows in a memory. In the embodiment, the stored program instructions further include program instructions to determine a plurality of subsets of pixel values in the plurality of input rows. In the embodiment, the number of pixel values in each row of a subset of pixel values is equal in number to a number of filter values in a filter, wherein the filter comprises a matrix size of a predetermined filter width by a predetermined filter height. In the embodiment, the stored program instructions further include program instructions to convolve each input row of each subset of pixel values with the filter values of the filter to determine a corresponding output value, and program instructions to store each output value in the memory in a two-dimensional matrix form.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments described herein generally relate to memory efficient convolution operations in a neural network such as a deep learning neural network. In one or more embodiments, a memory efficient convolution process is described in which a neural network application residing on one or more data processing systems and receives an input image data having pixel values arranged in a two-dimensional matrix representation of rows and columns. In particular embodiments, the neural network application requests or receives the image data from a data processing system in response to a request to perform the convolution from a client device. The data processing system retrieve the image data from a storage device and send the image data to the neural network application.

The neural network application transforms the input image data into a number of input rows. The pixel values in each input row correspond to the pixel values in a subset of the columns of the input image data and all of the rows of each column of the subset of columns. In one or more embodiments, the pixel values in the subset of columns of the input image data are arranged in a top-to-bottom and left-to-right manner. The neural network application stores the input rows in a memory. In particular embodiments, the memory is a temporary memory.

The neural network application then determines a number of subsets of pixel values in the input rows. In one or more embodiments, the number of pixel values in each row of a subset of pixel values is equal in number to a number of filter values in a filter to be used in the convolution operations. The filter is a predetermined matrix that is convolved with the image data to obtain a desired processing result. Examples of processing results include, but are not limited to, identifying particular features in the image data, detecting edges in the image data, sharpening the image data, and blurring the image data. In particular embodiments, determining the plurality of subsets includes determining a first subset, determining a second subset by shifting within each input row by a predetermined number of pixel values, and determining each subsequent subset by shifting further shifting within each input row by the predetermined number of pixel values from the previous subset.

In addition, the neural network application receives filter values for the filter in which the filter values are in a two-dimensional matrix form. The neural network application transforms the filter values from a two-dimensional matrix representation to a column representation.

The neural network application convolves each input row of each subset of pixel values with the filter values of the filter to determine a corresponding output value. In one or more embodiments, convolving each input row of each subset of pixel values with the filter values of the filter includes multiplying each pixel value of the subset of pixel values in the input row by a corresponding filter value in the filter, and summing the results of each multiplication to determine the corresponding output value.

The neural network application stores each output value in the memory in a two-dimensional matrix form to produce an output volume containing the result of the convolution of the original input image with the filter.

The illustrative embodiments are described with respect to certain types of matrices and matrix dimensions, arrays and array dimensions, filters, input and output dimensions, shifts, pixel values, filter values, convolution operations, neural networks, transmissions, validations, responses, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments.

Furthermore, a particular illustrative embodiment may have some, all, or none of the advantages listed above.

Figure 1:
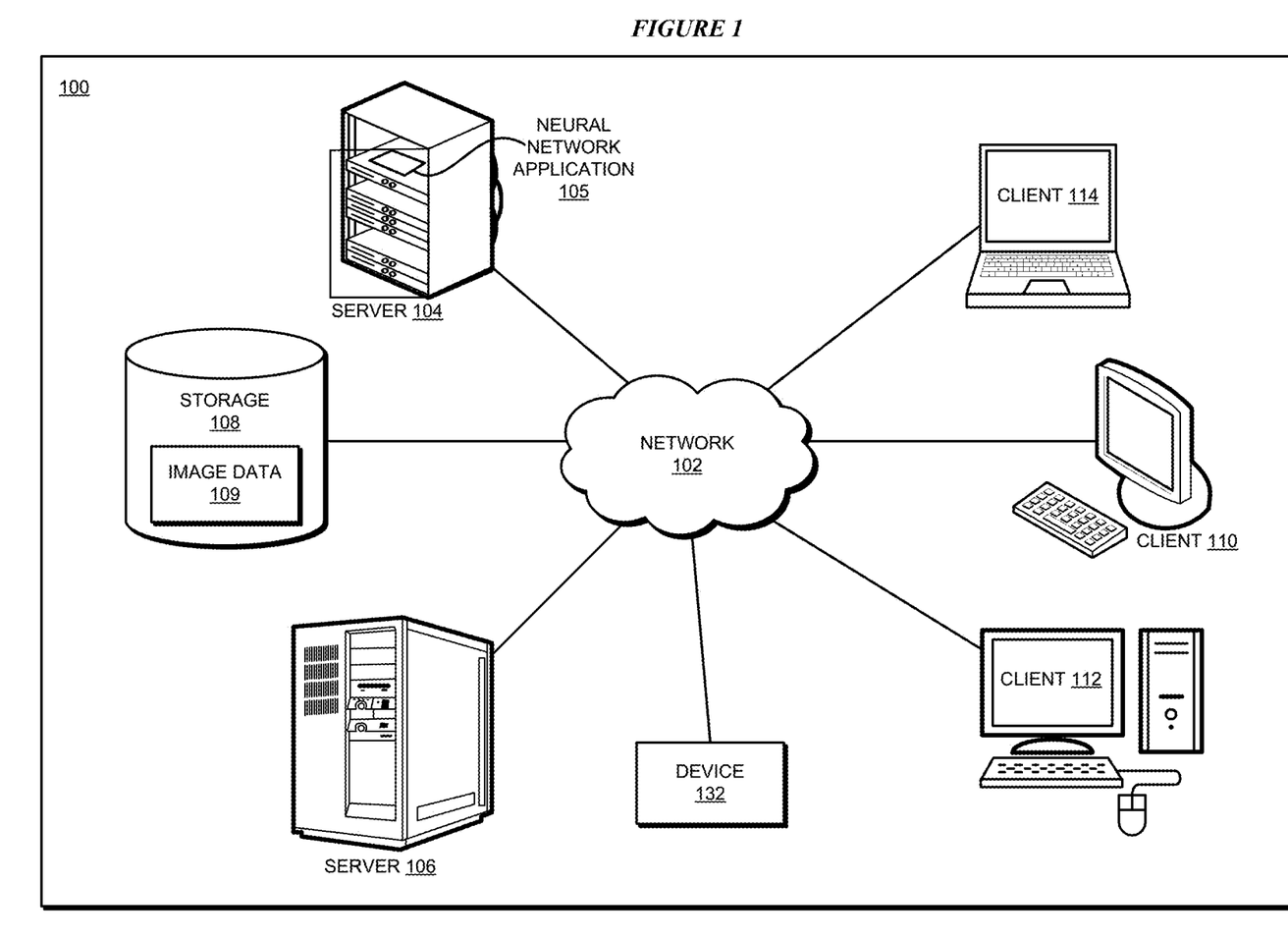
FIG. 1 depicts a block diagram of a network of data processing systems in which illustrative embodiments may be implemented.
Figure 2:
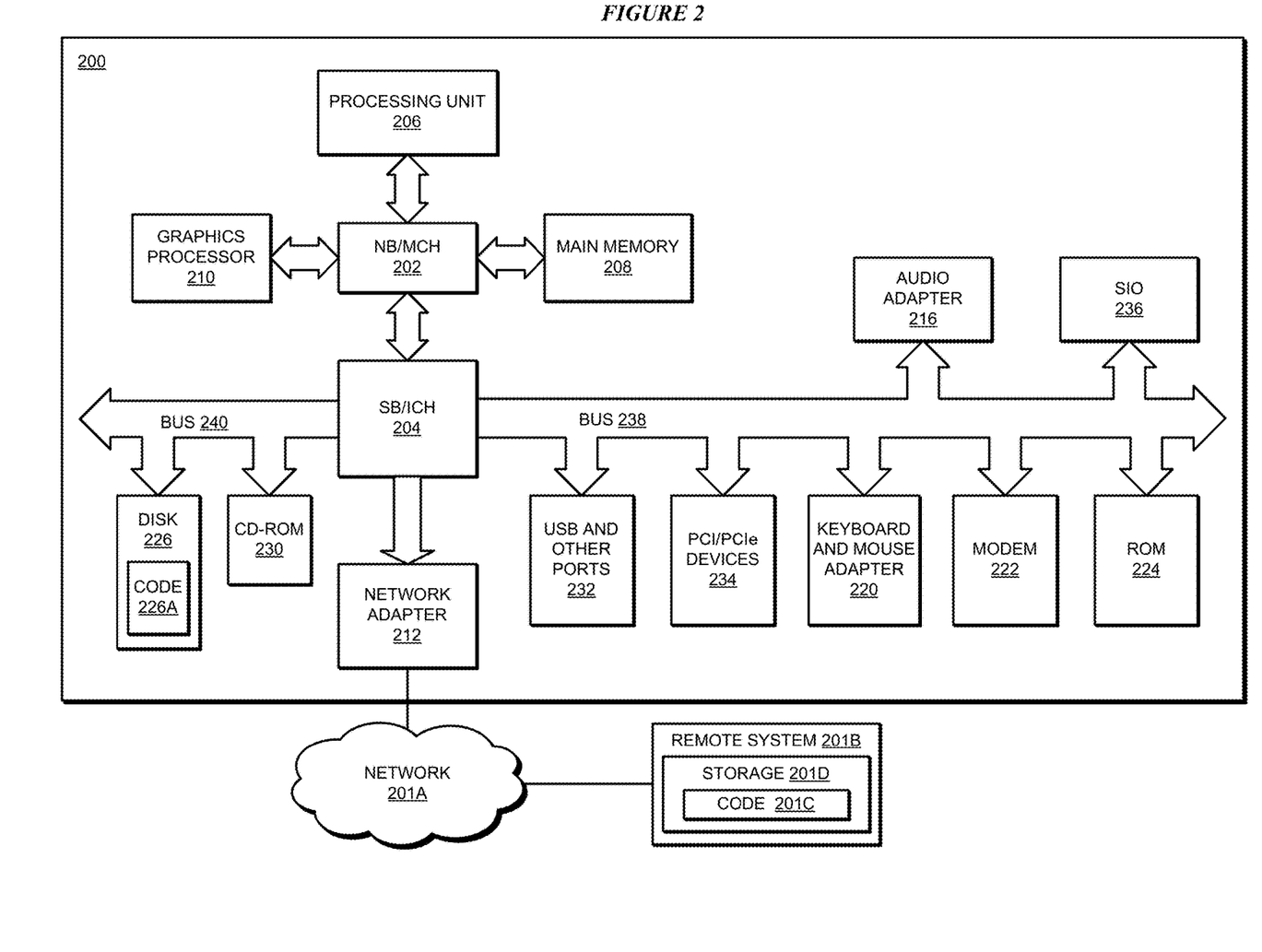
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. In one or more embodiments, storage 108 may be configured to image data 109 in which pixel values of an image are arranged in a two-dimensional matrix form. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Neural network application 105 of server 104 implements an embodiment of a neural network configured to perform convolution operations, such as a deep learning neural network, as described herein.

Device 132 is an example of a device described herein. For example, device 132 may send a request to server 104 to perform one or more data processing tasks by neural network application 105 utilizing one or more convolution operations. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as applications 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
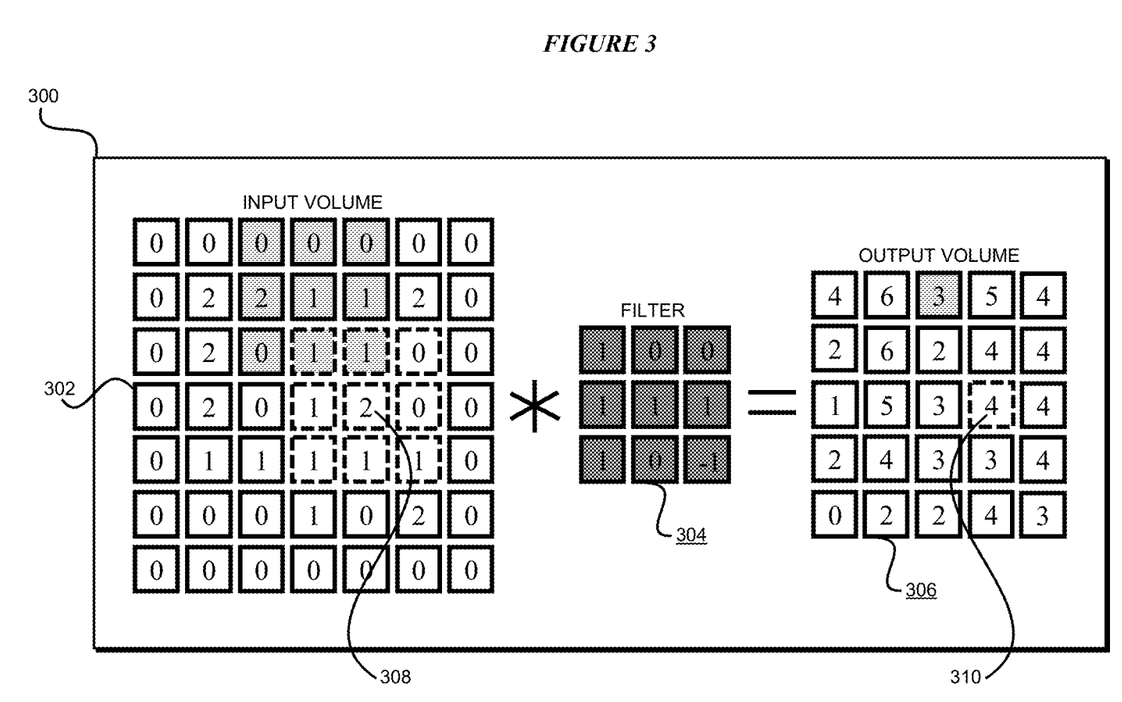
FIG. 3 depicts an example conventional convolution process.

With respect to FIG. 3, this figure depicts an example conventional convolution process that can be improved using an illustrative embodiment. In process 300, an input volume 302 including a matrix of image data is convolved with a filter 304 to produce an output volume 306. In the particular example of FIG. 3, the input volume 302 is a 7×7 dimensioned matrix of pixel values of the image. The filter 304 is a 3×3 dimensioned matrix of filter values, and the output volume 306 is a 5×5 dimensioned matrix of output values.

During the convolution operation, the operation successively slides filter 304 along input volume 302 on a pixel-by-pixel basis. For each particular pixel of input volume 302, the particular pixel and the eight pixels bordering the particular pixel are multiplied by the filter values of filter 304. The results are added together to obtain the output value within output volume 306 corresponding to the particular pixel. For example, the value of a particular pixel 308 and the values of the eight surrounding pixels are multiplied by filter 304 and the results summed together to obtain an output value 310 equal to a value of 4. In some cases, a bias value may be added to the result of the convolution to obtain the output value.

Conventional convolution process 300 continues on a pixel-by-pixel bases in which the filter 304 is convolved with every pixel of input volume 302 in a left-to-right and top-to-bottom manner. The illustrative embodiments recognize that the conventional convolution process 300 of FIG. 3 requires a zig-zag memory access pattern resulting in inefficient memory usage.

Figure 4:
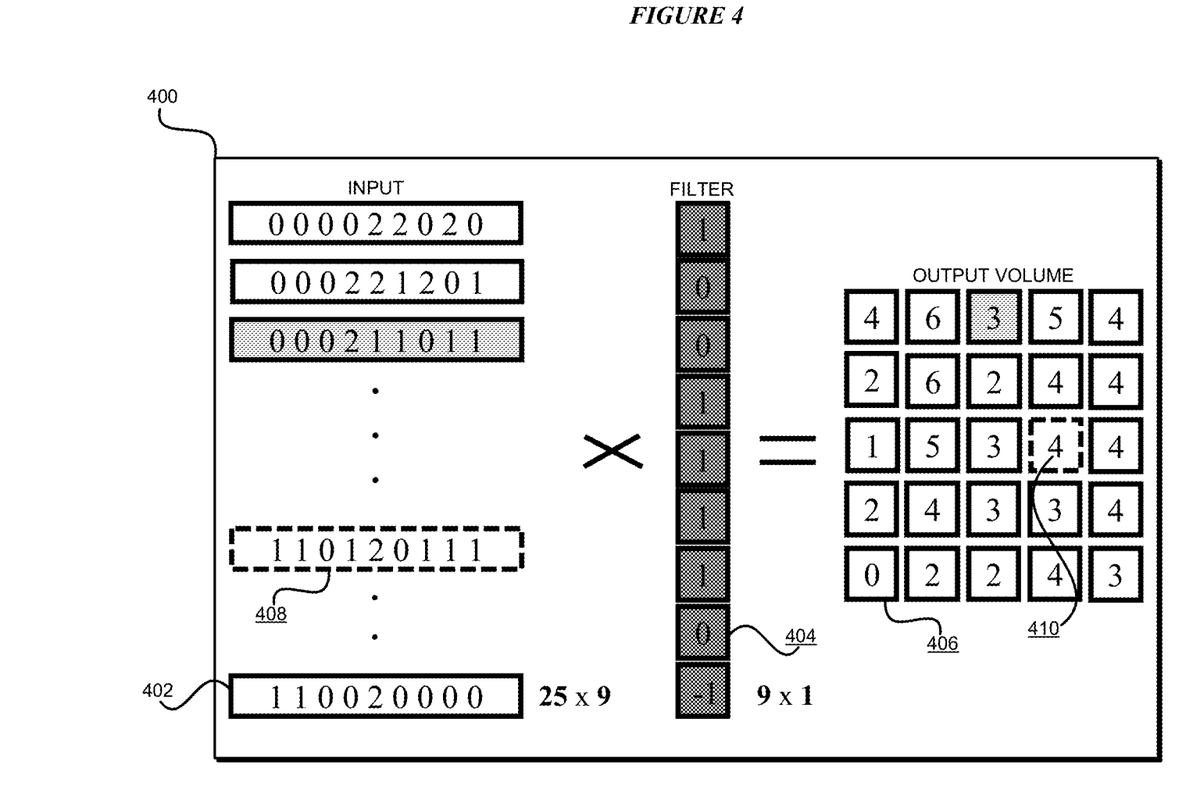
FIG. 4 depicts an example of another conventional convolution process.

With respect to FIG. 4, this figure depicts an example of another conventional convolution process that can be improved using an illustrative embodiment. Example process 400 of FIG. 4 utilizes the same input volume 302 as described with respect to FIG. 3 but is omitted from FIG. 3 for greater clarity. In conventional convolution process 400, the image matrix of input volume 302 is transformed into being represented by input rows 402. The values in each individual row are the same as the values of a particular submatrix of the image rearranged on a left-to-right and top-to-bottom basis. For example, a submatrix of the form:

[0 0 0]
[0 2 2]
[0 2 0]

is transformed into a row of:
[0 0 0 0 2 2 0 2 0]

The transformation occurs on a sliding basis for each pixel of the image. For example, the transformation in the example slides to the right by one pixel such that a submatrix of the form:

[0 0 0]
[2 2 1]
[2 0 1]

is transformed into a row of:
[0 0 0 2 2 1 2 0 1]

The transformation process continues until transformation of the pixel values of input volume 302 have been converted into rows. As a result, in the example illustrated in FIG. 4, the 9×9 pixel image of input volume 302 is transformed into 25 input rows 402 having 9 values within each row (25×9).

Further, in the conventional convolution process 400, the values of filter 304 are transformed from a matrix representation into a column representation 404. In the example illustrated in FIG. 4, filter 304 having a matrix form of:

[1 0 0]
[1 1 1]
[1 0 -1]

is transformed into a column of the form:
[1]
[0]
[0]
[1]
[1]
[1]
[1]
[0]
[-1]

Accordingly, the matrix representation of the input image in input volume 302 and the matrix representation of filter 304 are each transformed into linear representations. During the convolution operation, the values in each row of input rows 402 are multiplied with the corresponding values in the filter 404 and summed together to obtain an output value of output volume 406. For example, a particular input row 408 having values [1 1 0 1 2 0 1 1 1] is multiplied with filter 404 and the results are summed together to obtain an output value 410 equal to a value of 4. Conventional convolution process 400 continues until all of rows of input rows 402 have been convolved with filter 404 to obtain the values of output volume 406. The conventional convolution process 400 of FIG. 4 is able to utilize a linear memory access pattern. Although, conventional convolution process 400 provides for a linear memory access pattern, the amount of memory required to implement the process results in an inefficient usage of memory. For example, as can be seen in the example depiction of this figure, a 25×9 matrix is going to be multiplied by a 9×1 matrix, which requires significantly more computing resources, not limited to just memory, as compared to an example 5×21 matrix being advantageously multiplied by a 9×1 matrix in FIG. 5, for the same example image and filter. Note that the convolution computations in actual situations involve much larger matrices, causing significant wastage of computing resources according to the prior-art and therefore a significant improvement in the usage of those computing resources by using an embodiment described herein.

Figure 5:
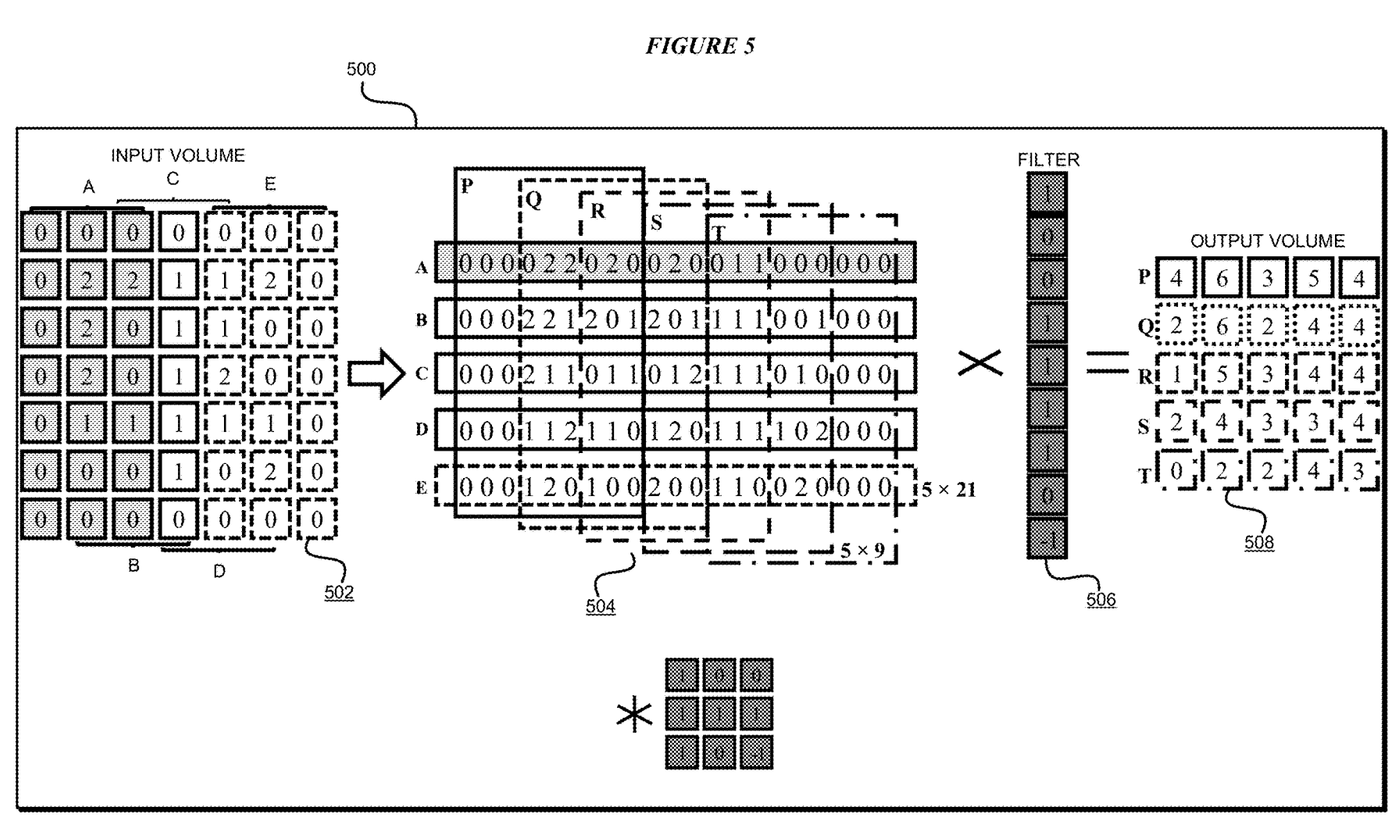
FIG. 5 depicts an example of a convolution process in accordance with an illustrative embodiment.

With reference to FIG. 5, this figure depicts an example of a convolution process 500 in accordance with an illustrative embodiment. In the convolution process 500, a pixel values of an input image are represented in a two-dimensional matrix form by a plurality of columns and rows within an input volume 502. The values of the image input are transformed into being represented by a plurality of input rows 502 in which values in each of input rows 504 correspond to the values in a subset of the columns of the image and all of the rows of a column of input volume 502 arranged in a top-to-bottom and left-to-right manner.

The specific sizes of the various matrices and arrays have been selected and depicted only as examples for the clarity of the description and not to imply any limitation on the illustrative embodiments. From this disclosure, those of ordinary skill in the art will be able to conceive similar operations with many other matrices and arrays of many other sizes, and the same are contemplated within the scope of the illustrative embodiments.

In the example of FIG. 5, a subset of 3 columns and 7 rows is chosen. A subset of 3 columns is chosen because it is equal to the width of the two-dimensional matrix of filter 506. A subset of 7 rows is chosen because it includes all of the rows of the image pixels of the two-dimensional matrix of input volume 502. The subset of 3 columns and 7 rows indicated as A in input volume 502 is of the form:

$$[0\ 0\ 0]$$
$$[0\ 2\ 2]$$
$$[0\ 2\ 0]$$
$$[0\ 2\ 0]$$
$$[0\ 1\ 1]$$
$$[0\ 0\ 0]$$
$$[0\ 0\ 0]$$

Transforming subset A by arranging the pixel values into a single row starting at the first column from top to bottom, the second column from top to bottom, and the third column from top to bottom produces an input row A of the form:
[0 0 0 0 2 2 0 2 0 0 2 0 0 1 1 0 0 0 0 0 0]
assuming a non-limiting example shift value of 1, the process shifts one column over to a new subset of 3 columns and 7 rows indicated as B in input volume 502. If the shift value were different the amount of shift would correspond to that shift value. As shown in FIG. 5, two columns of subset B overlap those of subset A. The resulting input row B is of the form:
[0 0 0 2 2 1 2 0 1 2 0 1 1 1 1 0 0 1 0 0 0]
in the depicted non-limiting example, the process continues for three more subsets (C, D, E) of input volume 502 resulting in input rows C, D, E of input rows 504. For different input matrix size, filter size, shift value, or some combination thereof, the number of subset may change accordingly. As a result, an input volume 502 including a 7×7 image matrix is transformed into 5 input rows (A, B, C, D, E, F) having 21 values within each row. In one or more embodiments, the input rows 504 are stored in temporary memory for further use during convolution process 500.

Further, in convolution process 500, the filter values of filter 506 are transformed from a two-dimensional matrix representation into a column representation. In the two-dimensional matrix representation of filter 506, a size of the two-dimensional matrix is of a predefined filter width by a predefined filter height. In the column representation, filter 506 is of a width having a single filter value and a height having filter values equal to the total number of filter values in the two-dimensional matrix. In the example illustrated in FIG. 5, filter 506 having a matrix form of:

$$[1\ 0\ 0]$$
$$[1\ 1\ 1]$$
$$[1\ 0\ -1]$$

is transformed into a column of the form:
[1]
[0]
[0]
[1]
[1]
[1]
[1]
[0]
[−1]

Accordingly, the matrix representation of the input image in input volume 502 and the matrix representation of filter 506 are each transformed into linear representations.

During the convolution operation, for each of input rows 504, a subset of pixel values in the input row equal in number to the number of filter values within filter 506 is convolved with filter 506 to produce an output value of output volume 508. In particular, each pixel value of the subset of pixel values in the input row is multiplied by a corresponding value in filter 506 and the results are added together to calculate the output value of output volume 508. For each subset, each row of the input rows is convolved with the filter values of filter 506 to produce a corresponding output value in output volume 508.

After the first subset of an input row is convolved with filter 506, a second subset of input rows is determined by shifting to the right with respect to the first subset. For each row of the second subset, the second subset is convolved with the filter 506 to produce a corresponding output value of output volume 508. Convolution process 500 continues until all subsets of the rows have been convolved with filter 506 to produce all of the values of output volume 508.

In the particular example of FIG. 5, a first subset P is determined that includes the first 9 values of each of input rows A-E of input rows 504. The values of input row A contained within subset P are convolved with the values of filter 506 to produce an output value at a first row and first column of output volume 508. Next, the values of input row B contained within subset P are convolved with the values of filter 506 to produce an output value at a first row and second column of output volume 508. The values within each of rows C, D, and E contained within the subset P are convolved with filter 504 to determine the remaining three values within the top row (identified by P in FIG. 5) of output volume 508.

A second subset Q is determined by shifting within each input row to the right by a predetermined number of shift values (which in this non-limiting example is 1). In one or more embodiments, the predetermined shift value from one subset (e.g., P) to the next subset (e.g., Q) is based on the filter width and the filter slide. In particular embodiments, the predetermined shift is determined by multiplying the filter width and the filter slide together. In the particular example of FIG. 5, a filter width of three (3) and a filter slide of (1) are multiplied together to obtain a shift of three such that the second subset Q includes the 4th to 9th values within each of the input rows input rows A-E of inputs rows 504. For each of input rows A-E, the values of the row contained within the second subset Q are convolved with filter 506 to determine output values of the second row (identified by Q) of output volume 508.

A third subset R is determined by shifting to the right within each input row by three values such that the third subset R includes the 7th to 15th values within each of the input rows A-E. For each of input rows A-E, the values of the row contained within the third subset R are convolved with filter 506 to determine output values of the third row (identified by R) of output volume 508.

A fourth subset S is determined by shifting to the right within each input row by three values such that the fourth subset S includes the 10th to 18th values within each of the input rows A-E. For each of input rows A-E, the values of the row contained within the fourth subset S are convolved with filter 506 to determine output values of the fourth row (identified by S) of output volume 508.

Continuing the convolution process 500, a fifth subset T is determined by shifting to the right within each row by three values such that the fifth subset T includes the $13^{th}$ to $21s^{th}$ values within each of the input rows A-E. For each of input rows A-E, the values of the row contained within the fifth subset T are convolved with filter 506 to determine output values of the fifth row (identified by T) of output volume 508. Accordingly, all output values of output volume 508 are determined by the convolution process 500. In one or more embodiments, the output values of output volume 508 are stored in a two-dimensional matrix form.

The spanning of subsets P, Q, R, S, T across input rows A, B, C, D, E is a result of applying filter 506 to the entire row depth of the image pixels. By choosing all 7 rows for each column to include in input rows 504 in the example of FIG. 5, filter 506 is applied to the filter width but to all the rows of the image pixels. Accordingly, the resulting convolution computations are reduced from 25×9 convolution computations in the example of FIG. 4, to 5×21 convolution computations in the example of FIG. 5.

Figure 6:
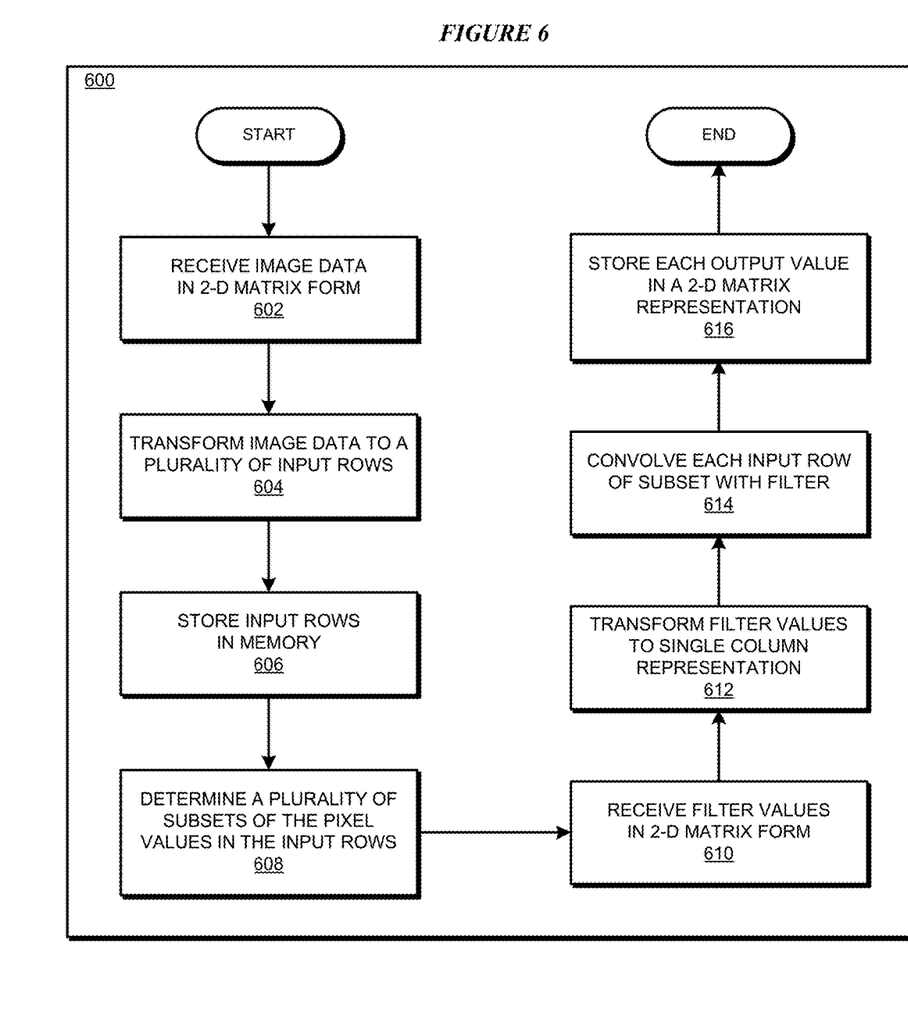
FIG. 6 depicts a flowchart of an example process for memory efficient convolution operations in a deep learning neural network in accordance with an illustrative embodiment.

With reference to FIG. 6, this figure depicts a flowchart of an example process 600 for memory efficient convolution operations in a deep learning neural network in accordance with an illustrative embodiment. In block 602, neural network application 106 receives input image data having a plurality of pixel values represented in a two-dimensional matrix form of columns and rows. In one or more embodiments, neural network application 106 requests the input image data from server 106, and server 106 retrieves image data 109 from storage device 108. In block 604, neural network application 105 transforms the input image data into a plurality of input rows. The pixel values in each input row correspond to the pixel values in a subset of the columns of the input image data and all of the rows of each column of the subset of columns. Accordingly, each input row is generated from the width of the filter but the entire height of the image data. In block 606, neural network application stores the plurality of input rows in a memory. In one or more embodiments, the pixel values in the subset of columns of the input image data are arranged in a top-to-bottom and left-to-right manner.

In block 608, neural network application 105 determines a plurality of subsets of pixel values in the plurality of input rows. In one or more embodiments, the number of pixel values in each row of a subset of pixel values is equal in number to a number of filter values in a filter to be used in the convolution operations. In the example of FIG. 5, the filter 506 is a 3×3 matrix having 9 filter values. As a result, the number of pixel values in each row of a subset is 9. In particular embodiments, determining the plurality of subsets includes determining a first subset, determining a second subset by shifting within each input row by a predetermined number of pixel values, i.e., the shift value, and determining each subsequent subset by shifting further shifting within each input row by the predetermined number of pixel values from the previous subset.

In block 610, neural network application 105 receives filter values for the filter in which the filter values are in a two-dimensional matrix form. In block 612, neural network application 105 transforms the filter values from a two-dimensional matrix representation to a column representation.

In block 614, neural network application 105 convolves each input row of each subset of pixel values with the filter values of the filter to determine a corresponding output value. In one or more embodiments, convolving each input row of each subset of pixel values with the filter values of the filter includes multiplying each pixel value of the subset of pixel values in the input row by a corresponding filter value in the filter, and summing the results of each multiplication to determine the corresponding output value. In particular embodiments, the convolving operations are perform within a neural network such as a deep learning neural network.

In 616, neural network application 105 stores each output value in the memory in a two-dimensional matrix form to produce the output volume containing the result of the convolution of the original input image with the filter. The process 600 then ends. In accordance with at least one embodiment, efficient utilization of memory is realized by the described process.

Although various embodiments are described with respect to performing convolution operations within a neural network, it should be understood that the principles described herein may be applied to any suitable convolutions performed by a computer system or other electronic device.

Thus, a computer implemented method, system or apparatus, and computer program product are provided in the illustrative embodiments for convolution operations with a neural network and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
receiving input image data having a plurality of pixel values represented in a two-dimensional matrix form of columns and rows;
selecting a plurality of subsets of the input image data, each subset comprising a plurality of adjacent columns of the input image data, each subset comprising all rows of the input image data, a number of columns in the plurality of adjacent columns equal to a predetermined width of a two-dimensional filter matrix;
arranging, in a left-to-right and top-to-bottom manner, each of the plurality of subsets into a corresponding linearized input row;
storing the plurality of linearized input rows in a memory;
convolving a first portion of a first linearized input row in the plurality of linearized input rows with filter values of the two-dimensional filter matrix to determine a corresponding first output value, a size of the first portion equal to a size of the two-dimensional filter matrix;
convolving a second portion of the first linearized input row with filter values of the two-dimensional filter matrix to determine a corresponding second output value, a size of the second portion equal to the size of the two-dimensional filter matrix, the second portion determined by shifting within the first linearized input row by a predetermined number of shift values from the first portion; and
storing each output value in the memory in a two-dimensional matrix form.

2. The method of claim 1, wherein selecting the plurality of subsets comprises:
determining a first subset; and
determining a second subset, the second subset being determined by shifting within each input row by a predetermined number of columns.

3. The method of claim 1, wherein convolving each linearized input row with the filter values of the two-dimensional filter matrix comprises:
multiplying each pixel value in the linearized input row by a corresponding filter value in the two-dimensional filter matrix; and
summing the results of each multiplication to determine the corresponding output value.

4. The method of claim 3, further comprising: arranging the filter values of the two-dimensional filter matrix in a column representation prior to the convolving.

5. The method of claim 4, further comprising transforming the filter values from a two-dimensional matrix representation to the column representation.

6. The method of claim 1, wherein the convolving is performed in a neural network.

7. A computer usable program product comprising one or more computer-readable storage media, and program instructions stored on at least one of the one or more computer readable storage media, the stored program instructions comprising:
program instructions to receive input image data having a plurality of pixel values represented in a two-dimensional matrix form of columns and rows;
program instructions to select a plurality of subsets of the input image data, each subset comprising a plurality of adjacent columns of the input image data, each subset comprising all rows of the input image data, a number of columns in the plurality of adjacent columns equal to a predetermined width of a two-dimensional filter matrix;
program instructions to arrange, in a left-to-right and top-to-bottom manner, each of the plurality of subsets into a corresponding linearized input row;
program instructions to store the plurality of linearized input rows in a memory;
program instructions to convolve a first portion of a first linearized input row in the plurality of linearized input rows with filter values of the two-dimensional filter matrix to determine a corresponding first output value, a size of the first portion equal to a size of the two-dimensional filter matrix;
program instructions to convolve a second portion of the first linearized input row with filter values of the two-dimensional filter matrix to determine a corresponding second output value, a size of the second portion equal to the size of the two-dimensional filter matrix, the second portion determined by shifting within the first linearized input row by a predetermined number of shift values from the first portion; and
program instructions to store each output value in the memory in a two-dimensional matrix form.

8. The computer usable program product of claim 7, wherein program instructions to select the plurality of subsets further comprises:
program instructions to determine a first subset; and
program instructions to determine a second subset, the second subset being determined by shifting within each input row by a predetermined number of columns.

9. The computer usable program product of claim 7, wherein the program instructions to convolve each linearized input row with the filter values of the two-dimensional filter matrix comprise:
program instructions to multiply each pixel value in the linearized input row by a corresponding filter value in the two-dimensional filter matrix; and
program instructions to sum the results of each multiplication to determine the corresponding output value.

10. The computer usable program product of claim 9, further comprising:
program instructions to arrange the filter values of the two-dimensional filter matrix in a column representation prior to the convolving.

11. The computer usable program product of claim 10, further comprising program instructions to transform the filter values from a two-dimensional matrix representation to the column representation.

12. A computer system comprising: one or more processors, one or more computer-readable memories, and one or more computer-readable storage media, and program instructions stored on at least one of the one or more computer-readable storage media for execution by at least one of the one or more processors via at least one of the one or more computer-readable memories, the stored program instructions comprising:
program instructions to receive input image data having a plurality of pixel values represented in a two-dimensional matrix form of columns and rows;
program instructions to select a plurality of subsets of the input image data, each subset comprising a plurality of adjacent columns of the input image data, each subset comprising all rows of the input image data, a number of columns in the plurality of adjacent columns equal to a predetermined width of a two-dimensional filter matrix;

program instructions to arrange, in a left-to-right and top-to-bottom manner, each of the plurality of subsets into a corresponding linearized input row;

program instructions to store the plurality of linearized input rows in a memory;

program instructions to convolve a first portion of a first linearized input row in the plurality of linearized input rows with filter values of the two-dimensional filter matrix to determine a corresponding first output value, a size of the first portion equal to a size of the two-dimensional filter matrix;

program instructions to convolve a second portion of the first linearized input row with filter values of the two-dimensional filter matrix to determine a corresponding second output value, a size of the second portion equal to the size of the two-dimensional filter matrix, the second portion determined by shifting within the first linearized input row by a predetermined number of shift values from the first portion; and program instructions to store each output value in the memory in a two-dimensional matrix form.

13. The computer system of claim 12, wherein program instructions to select the plurality of subsets further comprises:

program instructions to determine a first subset; and program instructions to determine a second subset, the second subset being determined by shifting within each input row by a predetermined number of columns.

14. The computer system of claim 12, wherein the program instructions to convolve each linearized input row with the filter values of the two-dimensional filter matrix comprise:

program instructions to multiply each pixel value in the linearized input row by a corresponding filter value in the two-dimensional filter matrix; and program instructions to sum the results of each multiplication to determine the corresponding output value.

15. The method of claim 1, wherein the predetermined number of shift values comprises a product of the predetermined width of the two-dimensional filter matrix and a filter slide value.

16. The computer usable program product of claim 7, wherein the predetermined number of shift values comprises a product of the predetermined width of the two-dimensional filter matrix and a filter slide value.

17. The computer system of claim 12, wherein the predetermined number of shift values comprises a product of the predetermined width of the two-dimensional filter matrix and a filter slide value.

* * * * *